United States Patent [19]

Ortel

[11] Patent Number: 5,119,416
[45] Date of Patent: Jun. 2, 1992

[54] AUTOMATED TELEPHONE NUMBER IDENTIFICATION FOR AUTOMATIC INTERCEPT IN TELEPHONE NETWORKS

[75] Inventor: William C. G. Ortel, New York, N.Y.
[73] Assignee: Nynex Corporation, New York, N.Y.
[21] Appl. No.: 530,657
[22] Filed: May 30, 1990
[51] Int. Cl.⁵ ............................................. H04M 3/52
[52] U.S. Cl. .................... 379/213; 379/246
[58] Field of Search .............. 379/213, 214, 210, 201, 379/246, 88, 89, 67

[56] References Cited

U.S. PATENT DOCUMENTS 3,571,517  3/1971  Amos, Jr. ............................ 379/213
4,791,666 12/1988  Cobb et al. .......................... 379/213

OTHER PUBLICATIONS

"Automation Potential of Operator Number (ONI) Intercept Services", Lewis, Speech Technology, Mar.-/Apr. 1988.
"Automatic Intercept System Organization and Objectives," Byrne, et al, Bell System Technical Journal, vol. 53, No. 1, Jan. 1974.

Primary Examiner—James L. Dwyer
Assistant Examiner—Ahmad F. Matar
Attorney, Agent, or Firm—Douglas J. Kirk; John J. Torrente

[57] ABSTRACT

An automatic telephone number identifier and method are provided wherein the seven digits of a telephone number developed in response to reentry of the number by a caller are validated by comparing the first three digits of the number to the NNX codes of the terminating central office of the trunk group carrying the call.

36 Claims, 3 Drawing Sheets

AUTOMATED TELEPHONE NUMBER IDENTIFICATION FOR AUTOMATIC INTERCEPT IN TELEPHONE NETWORKS

BACKGROUND OF THE INVENTION

This invention relates to providing automated telephone number identification in telephone networks and, in particular, to improving the reliability of the automated identification procedure.

In a typical telephone network, an automatic intercept system is used to provide a variety of automated voice responses to callers who dial numbers that are not in service. The automatic intercept system is an independent system that processes all calls which terminate in central offices and which are directed to non-working, disconnected, invalid or changed numbers. These calls are routed from their corresponding terminating central offices over trunk lines to the intercept system. To reduce trunk costs, concentrators are often used to concentrate the trunk lines from different groups of central offices into trunk groups which then feed the intercept system.

In selecting the proper voice response, the intercept system is required to know the phone number of the unsuccessful call (the "called number"). Newer terminating central offices store the called number as it is received and, thus, are able to automatically recall the number for use by the intercept system. Calls of this type are typically referred to as automatic number identification (ANI) calls.

Older terminating central offices, however, are not capable of storing and, therefore, recalling the called number. Therefore, these older central offices require that the automatic intercept system first initiate an operator intervention to communicate with the caller to obtain the called number and forward it to the intercept system. Such calls requiring operator intervention are typically referred to as operator number identification (ONI) calls.

As can be appreciated, the need of an operator to process ONI calls represents a major expense to telephone companies. Accordingly, a number of proposals have been made for automating the ONI function. A first proposal requires that the caller respond to an automated voice prompt which instructs the caller to reenter the called number via a touch-tone phone. However, this proposal is of limited value, since not all callers have touch-tone service.

A second proposal makes use of speech or voice recognition. In this case, an automated voice prompt instructs the caller to reenter the called number by speaking the number. A standard speech recognition device then interprets the spoken number to generate the digits of the called number which are then conveyed to the intercept system.

The use of speech recognition is advantageous, since it is not limited to a particular type of telephone, as in the touch-tone case. However, for speech recognition to be successfully used in automating the ONI function, the speech recognition devices employed must be capable of reliably interpreting the spoken telephone number. Unfortunately, speech recognition devices available today are considerably less than one hundred percent accurate, particularly where such devices must interpret the spoken language of a large and diverse population. As a result, automated operator number identification systems using speech recognition may result in incorrect number identification which, in turn, can cause inappropriate responses to be supplied by the automatic intercept system.

It is, therefore, an object of the present invention to provide a method and apparatus which allows called numbers to be automatically and more reliably identified.

It is a further object of the present invention to provide a method and apparatus as stated in the previous objective for automating operator number identification in an automatic intercept system.

SUMMARY OF THE INVENTION

In accordance with the principles of the present invention, the above and other objectives are realized in an apparatus and method in which a called number reentered by a caller for identification is compared with certain terminating central office codes (referred to as "NNX codes"). These codes are those of the central offices served by the trunk group carrying the call and the comparison is made to determine if the called number contains one of the NNX codes. If the called number does contain one of the NNX codes, the called number is accepted as valid and the call and called number are then passed to the automatic intercept system for normal processing. If not, the called number is either rejected as invalid and then passed to the automatic intercept system without a called number and with an instruction for operation intervention or the called number is further modified to reflect the best fit match to the NNX codes and then passed with the call to the intercept system again for normal processing.

In the apparatus and method of the invention, switch means is provided between the trunk groups associated with the different groups of terminating central offices and the automatic intercept system. This switch means, in response to a call on a trunk group, couples the call to an automatic telephone number recognizer along with an identification of the trunk group which carried the call to the switch means. The telephone number recognizer, after prompting the caller to reenter the called number, processes the reentered number to generate the digits of the number.

The telephone number recognizer then compares the digits of the called number with the NNX codes of the identified trunk group. If the digits contain one of the NNX codes, the recognition of the digits of the called number by the telephone number recognizer is deemed valid and the recognizer signals the switch means to pass the call and called number to the automatic intercept system for processing. If the digits do not contain any one of the NNX codes, the telephone number recognizer deems its recognition of the digits invalid and the call is passed without a called number to an operator at the intercept system. Alternatively, in this case, the telephone number recognizer may also make a best fit match between the NNX codes and the corresponding digits of the called number. The best fit match of the called number is then passed with the call by the switch means to the automatic intercept system for processing.

In the embodiment of the invention to be disclosed hereinafter, the telephone number recognizer contains a speech recognizer for converting verbally reentered called numbers into called number digits, a voice computer for providing verbal prompts to the caller, a look-up table associating or correlating central office NNX codes with corresponding trunk groups and a host computer for controlling these devices and making the comparison between recognized called number digits and central office NNX codes of an identified trunk group.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
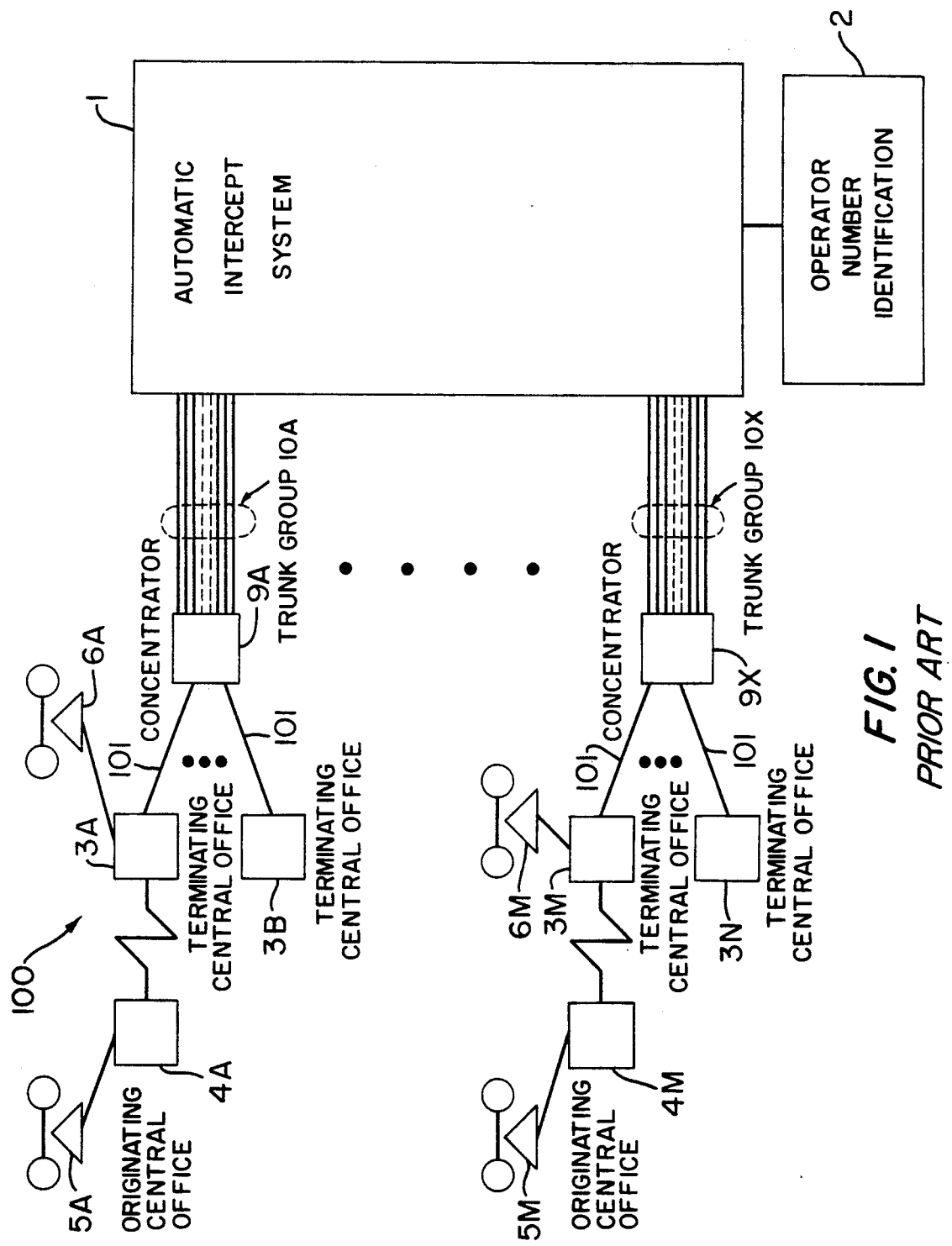
FIG. 1 illustrates a telephone network utilizing a conventional automatic intercept system provided with standard operator number identification.

FIG. 1 shows a conventional telephone network 100 provided with a standard automatic intercept system 1. The automatic intercept system 1 is designed to process calls directed to non-working, disconnected, invalid or changed telephone numbers at terminating central offices 3A to 3N. These calls originate at a plurality of originating central offices 4A to 4N serving groups of subscribers 5A to 5N. The terminating central offices 3A to 3N, in turn, serve groups of subscribers 6A to 6N.

The terminating end offices 3A to 3N include trunk lines 101 which convey from the terminating central offices calls to be processed by the automatic intercept system 1. In order to reduce the number of trunk lines, the trunks from different groups of terminating central offices are passed through concentrators 9A to 9X which concentrate the trunks into respective trunk groups 10A to 10X which serve the intercept system. With this configuration, each trunk group 10A to 10X is associated with a different concentrator and, hence, a different group of terminating central offices and will carry calls whose numbers contain the NNX codes of these central offices.

In operation of the telephone network 100, when a call is placed by a subscriber, e.g., 5A, the call is routed by the network through the originating central office 4A to the terminating central office whose NNX code is specified by the called number. Typically, the first three digits of a called number specify the terminating central office NNX code. In the present case, it is assumed that the first three digits of the called number specified the NNX code of the terminating central office 3A and, therefore, that the call is routed to this office.

When the call is received at central office 3A, if the called number is determined to be valid, the call is routed by the terminating office to the appropriate called subscriber 6A. If the called number is determined to be not valid (e.g., the number is non-working, disconnected, etc.), the terminating central office 3A routes the call to the automatic intercept system 1 via its respective trunk 101, the concentrator 9A and the trunk group 10A. The intercept system 1 then processes the call in normal or usual fashion to develop an appropriate response. The following are examples of typical responses generated by the automatic intercept system 1:

The number you have reached, '642 54 31', has been disconnected. Calls are being taken by '747 36 45'. Please make a note of it.

The number you have reached '368 11 00', is not in service in the '201' area code. Please check the number and dial again.

The number you have reached '432 98 72', has been changed, the new number is '741 32 32'.

In developing the above responses, the automatic intercept system 1 utilizes the called phone number. For ANI calls, i.e., those from terminating central offices which retain the digits of the called number in memory, the number is automatically available to the intercept system from the central office. For ONI calls, i.e., those from terminating central offices which do not have the facility to retain the called number, an operator number identification system 2 must first be invoked to ascertain the called number from the calling subscriber.

This is accomplished, as mentioned above, in present day systems by operator intervention. Thus, the ONI system 2 places the call in the hands of an operator who requests the caller to speak the called number to the operator. The operator then manually enters the digits of the called number and the digits are then forwarded to the automatic intercept system 1, where they are further processed to generate an appropriate response.

As can be appreciated, intervention of an operator to determine the called number for the automatic intercept system 1 for ONI calls is costly. Accordingly, in accordance with the principles of the present invention, a automatic telephone number identifier has been developed which can automatically and reliably identify reentered called numbers by a caller.

Figure 2:
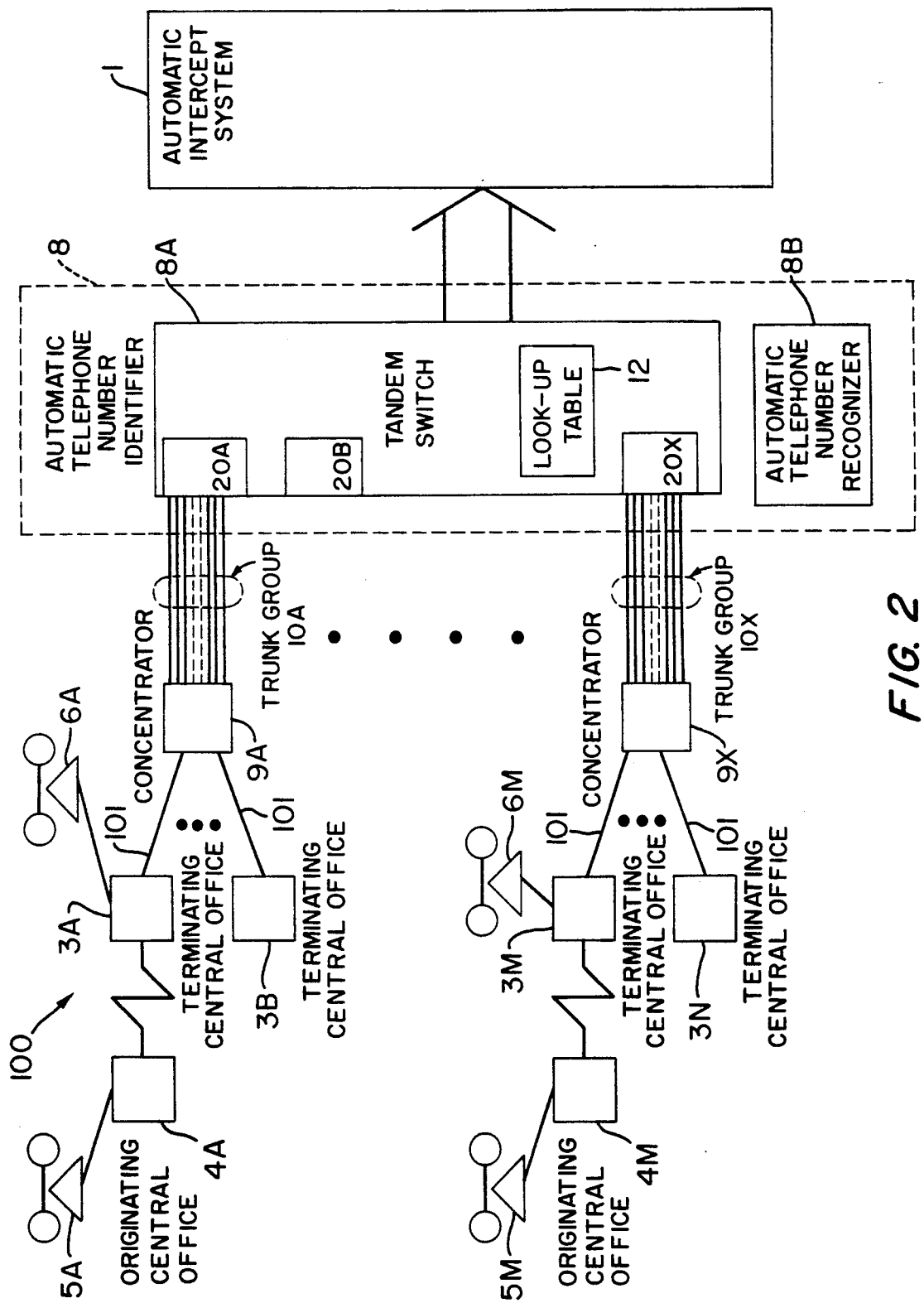
FIG. 2 illustrates the system of FIG. 1 provided with an automatic telephone number identifier in accordance with the principles of the present invention.

FIG. 2 shows the telephone network 100 modified to incorporate the automatic telephone number identifier 8 of the invention. The identifier 8 includes a switch 8a, shown as a tandem switch, interposed between the trunk groups 10A to 10X and the automatic intercept system 1 and an automatic telephone number recognizer 8b. The recognizer 8b communicates with the switch 8a and controls the processing of ONI calls passed by the trunk groups 10A to 10X to the switch for communication to the automatic intercept system 1.

More particularly, the switch 8a directs ONI calls received at its ports 20A to 20X from the truck groups 10A to 10X, respectively, to the telephone number recognizer 8b along with an identification of the trunk group of the received call. The recognizer 8b then automatically requests the caller to reenter a representation of the called number either by verbally speaking the number or by touch-tone reentry. The reentered number is then passed by the switch 8a to the telephone number recognizer 8b and the recognizer processes or interprets the representation to develop the seven digit called number.

To ensure that the processing by the telephone number recognizer 8b is reliable, the first three digits of the called number developed by the recognizer are then compared with the NNX codes of the terminating central offices of the trunk group identified when the call was passed to the recognizer. If a match is found, the telephone number recognizer 8b determines that its recognition and the recognized called number are valid. It then passes the seven digit called number and the call back to the switch 8a. The switch 8a, in turn, forwards the call and number to the intercept system 1 for continued automatic processing by the intercept system.

If a match is not found indicating that an invalid or incorrect called number has been developed by the recognizer 8a, the call is again passed to the switch, but this time without the developed called number. In this case, the switch terminates the automated process by forwarding the call to the intercept system with a request for manual operator number identification. Alternatively, in the case of an invalid developed called number, the telephone number recognizer 8b can select the NNX code which best matches the first three digits of the developed number. The recognizer 8b then passes the developed called number with its first three digits replaced by the selected NNX code and the call to the switch 8a for normal processing by the intercept system 1.

As can be appreciated by use of the above comparison technique in the telephone number recognizer 8b, the probability of the recognizer incorrectly determining the seven digit called number decreases. Accordingly, the number of incorrect responses supplied by the automatic intercept system 1 is correspondingly reduced.

As above-indicated, the switch 8a when passing a call to the telephone number recognizer 8b also accompanies this with an identification of the trunk group 10A to 10X from which the call was received. In the present case, this is accomplished by identifying the number of the concentrator 9A to 9X corresponding to the trunk group. More particularly, as shown in FIG. 2, the switch 8a contains a lookup table 12 which lists for each trunk connected to the switch the corresponding concentrator number. Thus, when an ONI call is routed to the switch 8a, the number of the trunk on which the call is received is determined by the switch. With the number of the trunk, the switch is then able to extract the number of the corresponding concentrator from the lookup table 12 and forward it to the recognizer 8a with the call as above-described.

Figure 3:
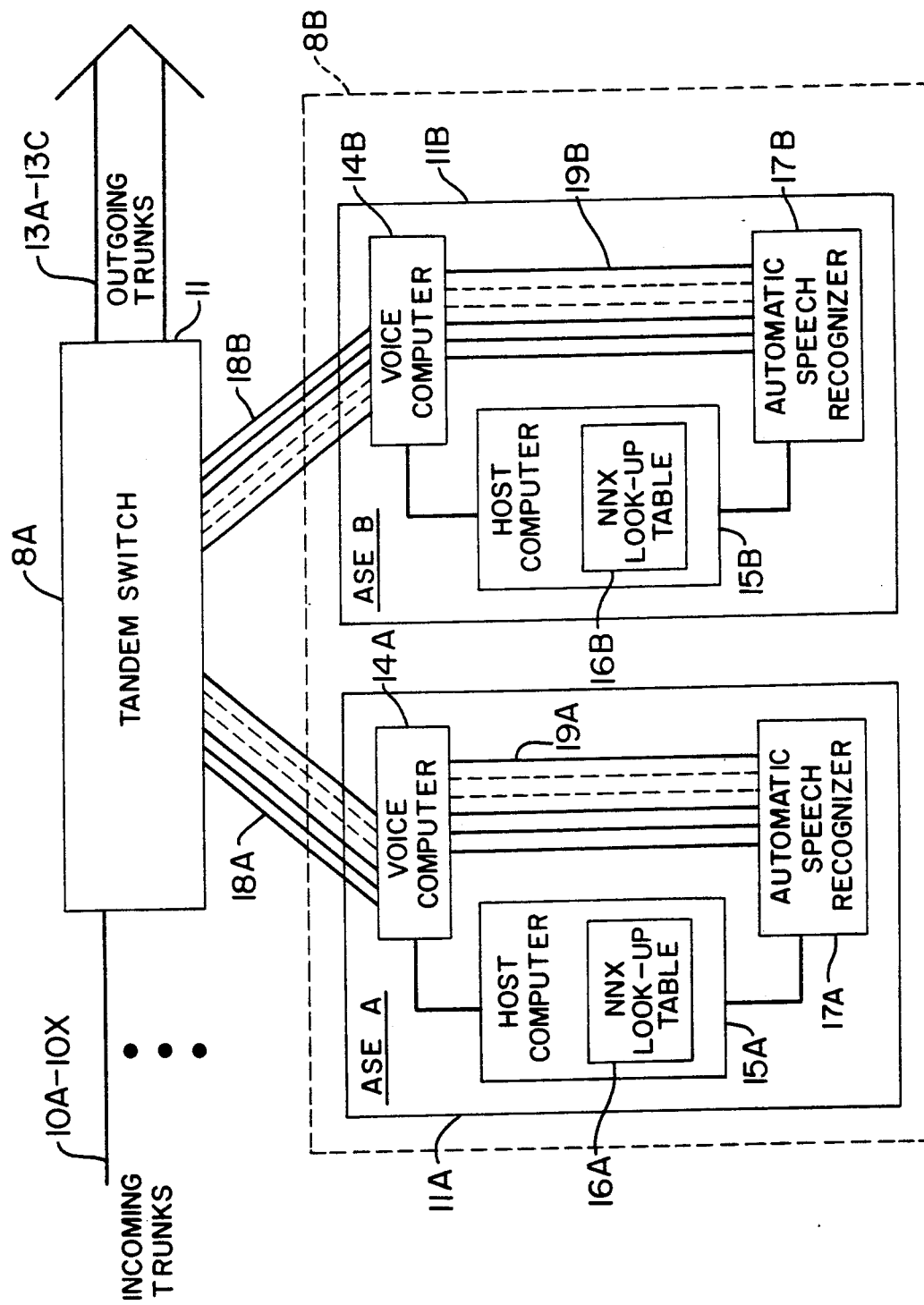
FIG. 3 shows the telephone number recognizer of the automatic telephone number identifier of FIG. 2 in greater detail.

FIG. 3 shows the details of an automatic telephone number recognizer which can be used for the recognizer 8b of FIG. 2 and which is specifically adapted to carry out its recognition function utilizing speech recognition. To facilitate a high degree of reliability, automatic telephone number recognizer 8b comprises two identical redundant sections 11a and 11b. Each telephone number recognizer section 11a, 11b is alternately fed calls from the tandem switch 8a. In the event of failure of one of the recognizer sections, all calls will be fed by the switch to the other section. Since the redundant telephone number recognizer sections 11a and 11b are identical, the description of the section 11a which follows will apply equally as well to the section 11b.

The telephone number recognizer section 11a is connected to the tandem switch 8a by trunks 18A. The number of trunks 18A is a function of the system loading and can be varied accordingly. The trunks 18A connect to a voice computer 14A which provides verbal prompts to the caller. The voice computer 14A in turn is connected by voice channels 19A to an automatic speech recognizer 17A which recognizes digits zero through nine when spoken by the caller.

Both the voice computer 14A and the automatic speech recognizer 17A are connected to a host computer 15A. The host computer 15A coordinates the operation of these elements. The host computer 15A also contains a NNX lookup table 16A. The NNX lookup table contains for each numbered concentrator 9A-9X, a list of the NNX codes for the termination central offices connected to that concentrator.

The operation of the above-described telephone number recognizer section 11a is as follows. When the tandem switch 8a routes an ONI call to the telephone number recognizer section 11a, the switch attaches to the call a dual tone multiple frequency digit signal identifying the number of the concentrator and, therefore, trunk group through which the call was routed. On the basis of this number, the host computer 15A extracts from the NNX lookup table 16A, the NNX codes of the termination central offices associated with the identified concentrator and trunk group.

The host computer 15A then commands the voice computer 14A to verbally request that the caller speak the number that was called. The response of the caller is then routed by the switch 8a through a voice channel 18A to an automatic speech recognizer 17A. The automatic speech recognizer 17A interprets the spoken digits to develop the seven digits of the called number. These digits are then serially transferred (the first three corresponding to the NNX code) to the host computer 15A.

The host computer 15A, upon receiving the seven digits of the called number developed by the automatic speech recognizer 17A, compares the first three digits with the NNX codes previously extracted from the NNX lookup table based on the concentrator number. If a match is found between the first three digits of the developed seven digit called number and any one of the extracted NNX codes, the mathematical probability is high that the three spoken digits are correct. As a result, the host computer 15A determines that a valid recognition has been made and that processing of the call by the intercept system 1 using the developed seven digit called number should be made.

The host computer thereupon forwards the call through the switch 8a to the intercept system 1 with the valid seven digit called number. The automatic intercept system 1, using the seven digit called number, then generates an appropriate response in normal fashion.

If there is no match between the first three digits of the developed called number and any of the extracted NNX codes, the automatic telephone recognizer section 11a considers its recognition invalid and ceases its attempt to automatically identify the called number. The recognizer section 11a then routes the call through the switch 8a to the automatic intercept system 1 without a developed called number. Instead, the call is provided with an instruction requesting operator intervention to determine the called number. In this manner, an incorrect response is avoided.

Alternatively, when there is no match, the host computer 15A can select, from the extracted NNX codes, the best fit match for the first three spoken digits. The host computer 15A then replaces the first three digits of the developed called number with the best fit match NNX code. The developed called number so modified and the call are then passed to the switch 8a and from there to the intercept system 1 for processing by the intercept system in normal fashion.

As a detailed illustration of the above, referring to FIG. 2, let it be assumed that terminating central offices 3A and 3B, which connect to tandem switch 8a through concentrator 9A, trunk group 10A and switch to port 20A, support ONI calls. Assume further that offices 3A and 3B have NNX numbers of '3 1 4' and '6 1 9', respectively, and that the four digits '4 6 7 9' correspond to the number of a subscriber 6A served by end office 3A. Finally, also assume that phone number '3 1 4 - 4 6 7 8' is not in service.

If a caller inadvertently dials '3 1 4 - 4 6 7 8', when attempting to call the subscriber at '3 1 4 - 4 6 7 9', the call will be routed to termination end office 3A. Termination end office 3A will attempt to complete the call to a subscriber at the number '4 6 7 8'. However, since no such number is in service the connection will not be completed.

Upon failing to obtain a connection, the terminating central office 3A thereupon routes the call, along with a request for automatic number identification through the concentrator 9A to the switch 8a. The request for automatic number identification may be indicated by appending a predetermined multiple frequency signal to the routed call.

The routed call arrives at the tandem switch 8a on one of the trunks of trunk group 10A. The switch 8a, recognizing the request for automatic number identification, identifies the incoming trunk line and extracts the corresponding concentrator number 9A from the lookup table 12. The call with the concentrator number 9A is then routed to the automatic telephone number identifier 8b.

Referring to FIG. 3, the host computer 15A, upon receiving the call with the concentrator number 9A, extracts the NNX codes of the central offices 3A and 3B, i.e., the codes '3 1 4' and '6 2 9' from the NNX lookup table 16A. The host computer 15A then instructs the voice computer 14A to initiate a voice message to the caller. A typical voice message might be "PLEASE SAY THE NUMBER YOU DIALED PAUSING BRIEFLY AFTER EACH DIGIT". When the caller responds, the automatic speech recognizer 17A interprets the spoken seven digits of the called number and serially transfers the interpreted digits to the host computer 15A.

For illustrative purposes, assume that the caller responds to the above by saying '3 1 4 - 4 6 7 8' and the speech recognizer 17A correctly interprets the digits as the same. The interpreted digits are then transferred to the host computer 15A and the first three digits '3 1 4' are compared against the extracted NNX codes '3 1 4' and '6 1 9'. Since a match is found for the first three digits '3 1 4', the remaining four digits are assumed to be correct. The interpreted seven digits are, therefore, deemed to be a valid called number. The call and the called number are then forwarded, as above-described, to the intercept system 1 where an appropriate response is generated.

For further illustrative purposes, assume the caller responds to the above by saying '3 1 4 - 4 6 7 8' and the speech recognizer 17A incorrectly interprets the digits as '3 1 5 - 4 6 7 8'. The interpreted digits are transferred to the host computer 15A and the first three digits '3 1 5' are compared with the NNX codes '3 1 4' and '6 1 9'. Since there is no match, the host computer 15A may stop the process and request operator intervention as above-described or may attempt to obtain a best fit match for the called number. If a best fit match is sought, the computer compares the digits '3 1 5' against the extracted NNX codes. The number '3 1 5' more closely matches '3 1 4' than '6 1 9', therefore the computer 15A selects the digits '3 1 4' as the first three digits of the called number. The remaining four digits are assumed to be correct. '3 1 4 - 4 6 7 8' is therefor deemed to be a valid called number and both the call and the number are forwarded to the intercept system 1 for normal processing.

For still further illustrative purposes, assume the caller responds to the above by saying '3 1 4 - 4 6 7 8' and the speech recognizer 17A incorrectly interprets the digits as '5 4 3 - 4 6 7 8'. The interpreted digits are transferred to the host computer 15A and the first three digits '5 4 3' are compared against the extracted NNX codes '3 1 4' and '6 1 9'. Since a match is not found for the first three digits '5 4 3', the host computer 15A again may either seek operator intervention or attempt to complete a best fit match. In the latter case, the computer 15A compares the digits '5 4 3' with the extracted NNX codes. As no close match exists, the host computer 15A will terminate its attempt to automatically identify the called number and operator intervention will be sought as described previously.

As above-indicated, newer terminating central offices generate ANI calls and do not need to have telephone number identification performed by the identifier 8. The switch 8a of the identifier 8 is thus adapted to support terminating offices developing ANI calls merely by routing these calls directly to the intercept system 1. In such case, the recognizer 8A is avoided completely.

It should also be noted that the computer 15A if adapted to perform a best fit match procedures available. The particular procedure used will depend upon the accuracy desired and the costs involved.

In all cases, it is understood that the above-described arrangements are merely illustrative of the many possible specific embodiments which represent applications of the present invention. Numerous and varied other arrangements can be readily devised in accordance with the principles of the present invention without departing from the spirit and scope of the invention. Thus, while the trunks of the terminating central office 3A–3N have been shown in the present embodiment of the invention as connected to concentrators 9A–9X, these trunks can be connected directly to the tandem switch 8a. Such direct connection to the tandem switch 8a might be made, for example, when a limited number of terminating offices are in use and a sufficient number of trunk lines 101 are available. Also while in the disclosed embodiment, voice recognition is used for ascertaining the called number, it is possible to use other techniques, such as touch tone detection, or a combination of techniques to increase the reliability of the called number identification.

What is claimed is:

1. An automatic telephone number identifier adapted to receive calls over a number of trunk groups, each trunk group containing one or more trunks and being associated with a number of terminating central offices each of which having an identifying central office code containing a number of digits and each routing to the associated trunk group calls directed to invalid called numbers entered by callers, said automatic telephone number identifier being further adapted to cause received calls to be coupled to an automatic intercept system and comprising:

means for identifying the trunk group of a received call;

and telephone number recognizer means including:

means for generating a request to the caller on the received call to reenter the called number: means for developing digits for the called number in response to reentry of the called number by the caller on the received call; and means for comparing the developed digits for the called number with the central office codes of the terminating central offices associated with the identified trunk group.

2. An automatic telephone number identifier in accordance with claim 1 further comprising:

switch means for receiving calls on said trunk groups and for passing said calls selectively to said telephone number recognizer means and to said automatic intercept system, said switch means including said trunk group identifying means.

3. An automatic telephone number identifier in accordance with claim 2 wherein:

when said comparing means finds a match between the developed digits for a called number and a central office code to which it is being compared, said comparing means passes the received call to said switch means with the developed digits for the called number for processing by said automatic intercept system.

4. An automatic telephone number identifier in accordance with claim 3 wherein:

when said comparing means fails to find a match between the developed digits for a called number and any of the central office codes to which it is compared, said comparing means selects a central office code that is an estimate for the corresponding digits for the developed called number and passes the received call and the developed digits with the selected central office code substituted for the corresponding digits to said switch means for processing by said automatic intercept system.

5. An automatic telephone number identifier in accordance with claim 3 wherein:

when said comparing means fails to find a match between the developed digits for a called number and any of the central office codes to which it is compared, said comparing means passes the received call to said switch means without any developed digits for the called number for processing by said automatic intercept system using operator intervention.

6. An automatic telephone number identifier in accordance with claim 2 wherein;

said means for developing comprises an automatic speech recognizer which is responsive to verbal reentry of said called number.

7. An automatic telephone number identifier in accordance with claim 6 wherein:

said means for generating a request to the caller includes a voice computer for requesting the caller to reenter the called number.

8. An automatic telephone number identifier in accordance with claim 7 wherein:

said telephone number recognizer means further includes host computer means for controlling said means for developing and said voice computer, said host computer including said comparing means.

9. An automatic telephone number identifier in accordance with claim 2 wherein:

each said trunk group is developed by a concentrator which concentrates trunk lines of the terminating central offices associated with the trunk group.

10. An automatic telephone number identifier in accordance with claim 9 wherein:

said means for identifying identifies the truck group of a received call by identifying the concentrator associated with the trunk group.

11. An automatic telephone number identifier in accordance with claim 10 wherein:

said means for identifying includes a table listing each concentrator and the individual trunks of the trunk group associated with that concentrator.

12. An automatic telephone number identifier in accordance with claim 11 wherein:

said comparing means includes a table listing each concentrator and the central office codes of the terminating central offices corresponding to that concentrator.

13. An automatic telephone number identifier in accordance with claim 2 wherein:

said comparing means compares the first three digits developed for the called number with the central office codes to which the called number is being compared.

14. A telephone network comprising:

a number of terminating central offices each of which having an identifying central office code containing a number of digits and each of which routing to an associated trunk group calls directed to invalid called numbers entered by callers;

a number of trunk groups, each containing one or more trunks and being associated with a number of said terminating central offices for carrying calls to an automatic telephone number identifier;

and an automatic telephone number identifier responsive to said trunk groups and adapted to cause received calls to be coupled to an automatic intercept system, said automatic telephone number identifier comprising: means for identifying the trunk group of a received call; and telephone number recognizer means including:

means for generating a request to the caller on the received call to reenter the called number;

means for developing the digits for the called number in response to reentry of the called number by the caller on the received call; and means for comparing the developed digits for the called number with the central office codes of the terminating central offices associated with the identified trunk group.

15. A telephone network in accordance with claim 14 wherein:

said automatic telephone number identifier further includes switch means for receiving calls on said trunk groups and for passing said calls selectively to said telephone number recognizer means and to said automatic intercept system, said switch means including said trunk group identifying means.

16. A telephone network in accordance with claim 15 wherein:

when said comparing means finds a match between the developed digits for a called number and a central office code to which it is being compared, said comparing means passes the received call to said switch means with the developed digits for the called number for processing by said automatic intercept system.

17. A telephone network in accordance with claim 16 wherein:

when said comparing means fails to find a match between the developed digits for a called number and any of the central office codes to which it is compared, said comparing means selects a central office code that is an estimate for the corresponding digits for the developed called number and passes the received call and the developed digits with the selected central office code substituted for the corresponding digits to said switch means for processing by said automatic intercept system.

18. A telephone network in accordance with claim 16 wherein:
when said comparing means fails to find a match between the developed digits for a called number and any of the central office codes to which it is compared, said comparing means passes the received call to said switch means without any developed digits for the called number for processing by said automatic intercept system using operator intervention.

19. A telephone network in accordance with claim 15 wherein:
said means for developing comprises an automatic speech recognizer which is responsive to verbal reentry of said called number;
said means for generating a request to a caller comprises a voice computer;
and said telephone number recognizer means further includes: host computer means for controlling said means for developing and said voice computer, said host computer means including said comparing means.

20. A telephone network in accordance with claim 15 further comprising:
a number of concentrators each providing a different trunk group by concentrating the trunk lines of the terminating central office associated with the trunk group.

21. A telephone network in accordance with claim 20 wherein:
said means for identifying identifies the truck group of a received call by identifying the concentrator associated with the trunk group.

22. A telephone network in accordance with claim 21 wherein:
said means for identifying includes a table listing each concentrator and the individual trunks of the trunk group associated with that concentrator.

23. A telephone network in accordance with claim 22 wherein:
said comparing means includes a table listing each concentrator and the central office codes of the terminating central offices corresponding to that concentrator.

24. A telephone network in accordance with claim 15 wherein:
said comparing means compares the first three digits for the developed called number with the central office codes to which the called number is being compared.

25. A method of identifying called telephone numbers of calls received over a number of trunk groups and to be passed to an automatic intercept system, each trunk group containing one or more trunks and being associated with a number of terminating central offices, each terminating central office routing to the trunk groups calls directed to invalid called numbers entered by callers and each central office having an identifying central office code containing a number of digits, said method comprising:
identifying the trunk group of a received call;
and recognizing the called number of the received call including:
requesting the caller on the received call to reenter the called number;
developing digits for the called number in response to reentry of the called number by the caller on the received call; and
comparing the developed digits for the called number with the central office codes of the terminating central offices associated with the identified trunk group.

26. A method in accordance with claim 25 further comprising:
receiving calls on said trunk groups and passing said received calls to said automatic intercept system, said recognizing step being carried out prior to said passing step.

27. A method in accordance with claim 26 wherein:
when in said comparing step a match is found between the developed digits for a called number and a central office code to which it is being compared, said passing step includes passing the developed digits for the called number along with the received call to said automatic intercept system.

28. A method in accordance with claim 27 wherein:
when in said comparing step a match between the developed digits for a called number and any of the central office codes to which it is compared is not made, said comparing step further includes selecting a central office code that is an estimate for the corresponding digits for the developed called number and said passing step includes passing the developed digits with the selected central office code substituted for the corresponding digits along with the said received call to said automatic intercept system.

29. A method in accordance with claim 27 wherein:
when in said comparing step a match between the developed digits for a called number and any of the central office codes to which it is compared is not made, said comparing step includes passing the received call without any developed digits for the called number to said automatic intercept system with a request for operator intervention.

30. A method in accordance with claim 29 wherein: said developing step comprises interpreting verbal reentry of said called number.

31. A method in accordance with claim 30 wherein; said requesting step is carried out verbally.

32. A method in accordance with claim 26 wherein: each said trunk group is developed by a concentrator which concentrates trunk lines of the terminating central offices associated with the trunk group.

33. A method in accordance with claim 32 wherein: said identifying step identifies the truck group of a received call by identifying the concentrator associated with the trunk group.

34. A method in accordance with claim 33 wherein: said identifying step in carried out using a table listing each concentrator and the individual trunks of the trunk group associated with that concentrator.

35. A method in accordance with claim 34 wherein: said comparing step in carried out using a table listing each concentrator and the central office codes of the terminating central offices corresponding to that concentrator.

36. A method in accordance with claim 26 wherein: said comparing step includes comparing the first three digits for the developed called number with the central office codes to which the called number is being compared.

* * * * *

UNITED STATES PATENT AND TRADEMARK OFFICE
CERTIFICATE OF CORRECTION

PATENT NO. : 5,119,416
DATED : June 2, 1992
INVENTOR(S) : William C.G. Ortel

It is certified that error appears in the above-identified patent and that said Letters Patent is hereby corrected as shown below:

Col. 2, line 29.  Change "operation" to -- operator --
Col. 4, line 31.  Change "a" to -- an --
Col. 7, lines 2, 4, 8.  Change "8" to -- 8 --
Col. 7, line 55.  Change "5" to -- 5 --
Col. 8, line 26.  After "match" insert -- as discussed above can do so with any standard best fit match--

Signed and Sealed this

Thirty-first Day of August, 1993

Attest:

BRUCE LEHMAN

Attesting Officer

Commissioner of Patents and Trademarks